(No Model.)

W. H. WELLSTEED.
FEED TROUGH.

No. 516,339. Patented Mar. 13, 1894.

Witnesses
Julius Ulke, Jr.
N. F. Riley

Inventor
William H. Wellsteed,
By his Attorneys.
C. A. Snow & Co.

THE NATIONAL LITHOGRAPHING COMPANY,
WASHINGTON, D. C.

UNITED STATES PATENT OFFICE.

WILLIAM H. WELLSTEED, OF GLADSTONE, MICHIGAN.

FEED-TROUGH.

SPECIFICATION forming part of Letters Patent No. 516,339, dated March 13, 1894.

Application filed June 27, 1893. Serial No. 478,971. (No model.)

*To all whom it may concern:*

Be it known that I, WILLIAM H. WELLSTEED, a citizen of the United States, residing at Gladstone, in the county of Delta and State of Michigan, have invented a new and useful Improvement in Feed-Troughs, of which the following is a specification.

The invention relates to improvements in feed troughs.

The object of the present invention is to provide a device for regulating the supply of feed to an animal to avoid wasting feed and grain and to prevent an animal from eating too rapidly and insufficiently masticating it, and also to prevent the animal from wetting a large quantity of feed or grain with saliva.

The invention consists in the construction and novel combination and arrangement of parts hereinafter fully described, illustrated in the accompanying drawings and pointed out in the claims hereto appended.

Figure 1:
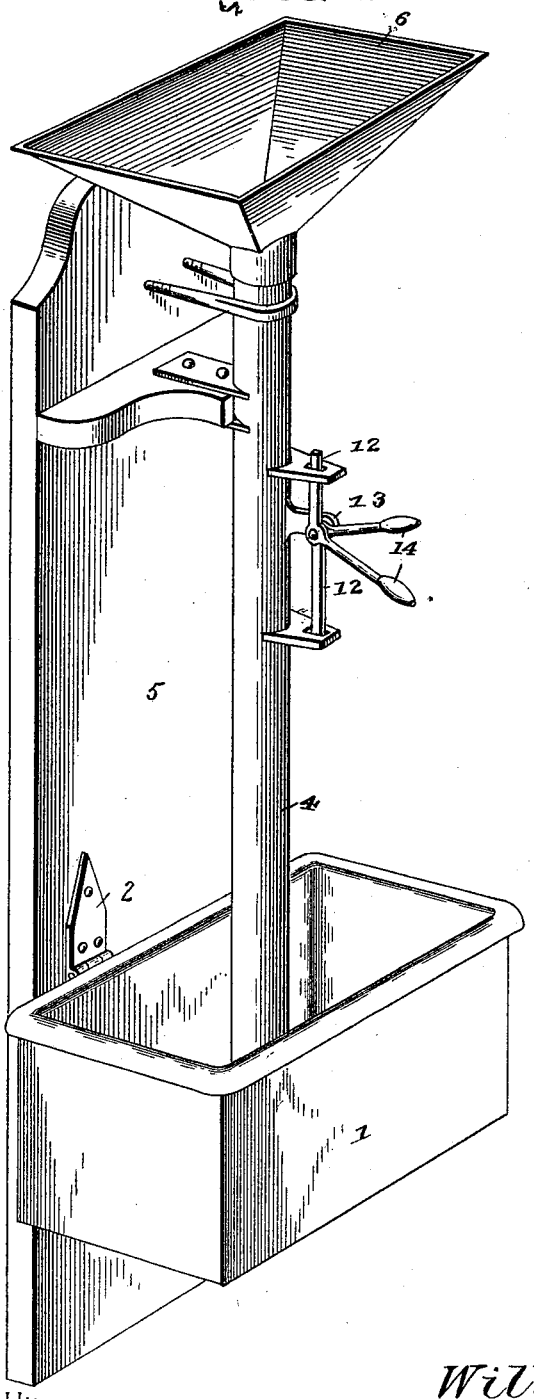
Figure 2:
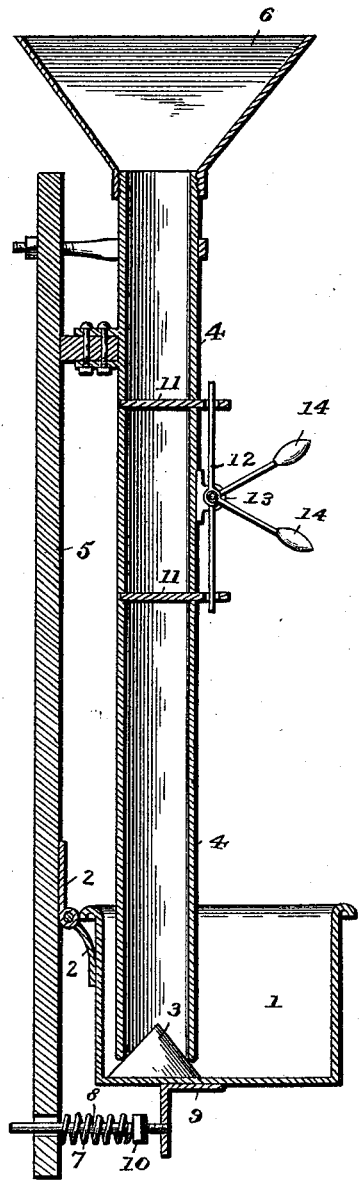

In the drawings—Figure 1 is a perspective view of a feed trough constructed in accordance with this invention. Fig. 2 is a vertical sectional view.

Like numerals of reference indicate corresponding parts in both figures of the drawings.

1 designates a feed trough, hingedly connected to a suitable support by hinges 2, which are arranged at the upper rear edge of the feed trough. The feed trough is provided on its bottom on the upper face thereof with a cone 3, which fits and partially projects into the lower end of the vertical tube 4 to close the latter, and which is adapted to be withdrawn from the tube by depressing the feed trough 1 to permit a supply of feed or grain to enter the feed trough. The tube 4 is suitably secured to the wall or support 5, and is provided at its upper end with a hopper 6 for holding the feed or grain. The trough is depressed against the action of a spiral spring 7 by an animal in eating to obtain its feed; and the spring is adapted for holding the cone against the lower end of the tube, which is normally closed. The spiral spring 7 is disposed on a rod 8, and is interposed between the wall or support 5 and a depending portion of an L-shaped arm 9 to which the outer end of the rod is secured. The outer end of the spring bears directly against a nut 10, which is mounted on a threaded portion of the rod 8, and which is adapted to regulate the depression of the trough to limit the discharge of the feed. The inner or rear end of the rod is loosely arranged in a perforation of the wall or support 5, and is adapted to move freely therein when the trough is depressed by an animal and raised by the spring.

The amount of feed delivered to the lower portion of the tube for supplying the trough may be measured by upper and lower cutoff slides 11, which are arranged in slots or openings of the tube, and which are actuated by bell crank levers 12. The bell-crank levers 12 are fulcrumed at their angles on a support 13, and each has one arm disposed vertically and connected to a cutoff slide and its other arm extending outward from the support and provided with a handle 14. The cutoff slides may be independently or simultaneously operated, and they will enable the amount of feed delivered to an animal to be readily measured.

It will be seen that the means for regulating and measuring the supply of feed are simple and comparatively inexpensive in construction, that they prevent an animal eating too rapidly and insufficiently masticating its food, and that they prevent the food from being wasted, or a large quantity of the feed from being injured by being wet with saliva.

Changes in the form, proportion and the minor details of construction may be resorted to without departing from the principle or sacrificing any of the advantages of this invention.

What I claim is—

1. The combination with a suitable support, of a supply tube, a trough hinged at its upper edge to the support and adapted to swing inward and downward and provided on its bottom with a cone fitting in the lower end of the supply tube and closing the same, and a spring for holding the cone in contact with the lower end of the supply tube, substantially as described.

2. The combination of a discharge tube, a trough hinged at its upper rear edge and receiving the lower end of the discharge tube and provided with a depending arm, a cone mounted on the trough and fitting in the lower end of the tube and closing the same, a rod secured to the depending arm, and a spiral spring disposed on the rod and holding the cone against the tube, substantially as described.

3. The combination of a discharge tube, a feed trough receiving the lower end of the tube and hingedly mounted at its upper rear edge and provided with a depending arm, a rod secured to the arm and having a threaded portion, a cone mounted on the trough and fitting in the lower end of the tube and closing the same, a spring disposed on the rod for holding the cone against the tube, and a nut arranged on the threaded portion of the rod and engaging the spring, substantially as and for the purpose described.

In testimony that I claim the foregoing as my own I have hereto affixed my signature in the presence of two witnesses.

WILLIAM H. WELLSTEED.

Witnesses:
CLAYTON VOORHIS,
J. M. TRACY.